INVENTORS.
HORACE L. NEWKIRK
WILLIAM R. HASELTINE
BY

ATTORNEY.

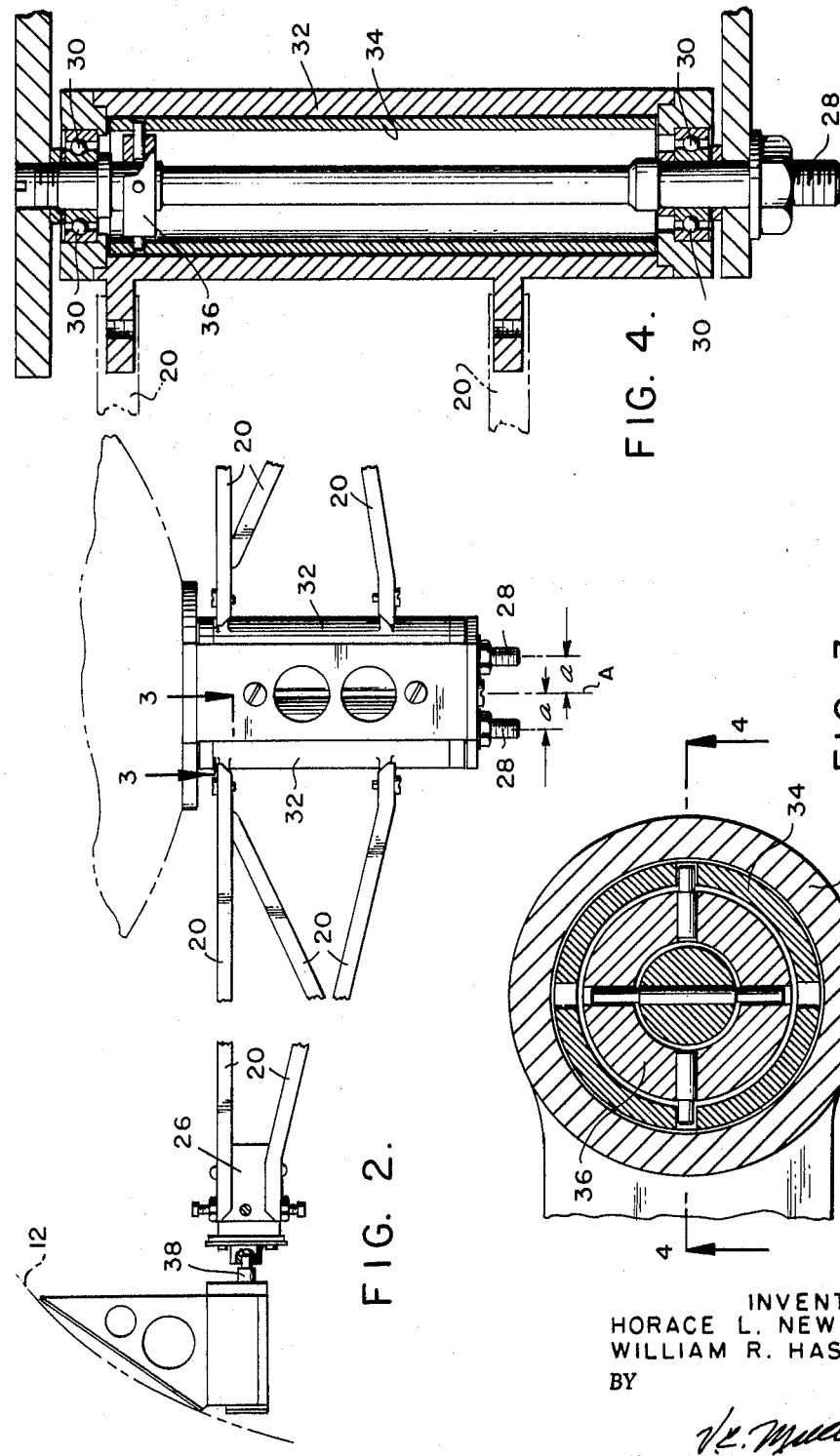

United States Patent Office 3,249,321
Patented May 3, 1966

3,249,321
NUTATION DAMPER
Horace L. Newkirk and William R. Haseltine, China Lake, Calif., assignors to the United States of America as represented by the Secretary of the Navy
Filed Feb. 28, 1964, Ser. No. 348,916
5 Claims. (Cl. 244—1)

The invention described herein may be manufactured and used by or for the Government of the United States of America for governmental purposes without the payment of any royalties thereon or therefor.

This invention relates to spin stabilized satellites and more particularly to improvements in apparatus for damping nutation.

A specific application of the invention is that employed in the S-6 satellite now in orbit around the earth. The satellite comprises a spherical shell containing various types of sampling apparatus, instrumentation, communication equipment, power supply, etc. as desired for its intended purpose and was launched in three stages of boost, the first two being guided or controlled. The last or injection stage was attained by a spin stabilized booster motor disposed behind and attached to the statellite. As will be apparent, the overall configuration at this time was an elongated body spinning about its longitudinal axis. The moment of inertia about any transverse axis was thus greater than about its longitudinal axis. It is well known that such a body, if not rigid, is unstable and develops wobble or nutation which increases in time. Because of the probability of after-burning bursts it was considered desirable to maintain the final stage motor attached to the satellite for about 25 minutes after burnout or thrust termination. During this period, significant nutation was expected to develop and which, if allowed to continue in the satellite after separation of the booster motor, would render difficult the reduction of data obtained by the satellite. The use of gas jets to damp nutation during this period was not a permissible solution, due to their contaminating effects on the atmosphere which was also to be sampled prior to separation of the first booster motor.

Various dampers have been proposed in the past for damping nutation of free spinning bodies. Among these include mercury or other fluid masses partially filling ring shaped channels; discs or rings in sliding engagement to dissipate energy through friction; and masses movable along curved tracks which lie in a plane containing the axis of rotation. Disadvantages of such devices include the difficulty of controlling design parameters to obtain the most effective damping, difficulty of obtaining optimum dynamic balance in the steady state; and difficulty to activate (uncage) by command signal. Also, while certain of these devices have been successfully employed with certain missiles moving within the earth's gravitational field, with the exception of the last named type, little is known about the predictability of their operation in a satellite.

One of the objects of the invention is to provide a nutation damper having mass which is immovable relative to the satellite and attached booster, until separation, to render such assembly as rigid as possible and thereby minimize nutation of the assembly.

Another object is to provide a damper which can be rendered effective to provide rapid nutation damping shortly after separation of a booster motor.

A further object is to provide a damper which requires no power to operate.

A further object is to provide a damper which obviates ejection of atmosphere contaminating gas about a satellite.

A further object is to provide a damper which can be readily designed and adapted for use with any spin stabilized satellite if certain satellite parameters are known.

Further objects are to provide a damper which is simple in construction and highly reliable in operation.

Still further objects, advantages and salient features will become more apparent from a consideration of the description to follow, the appended claims and the accompanying drawing, in which:

FIG. 2 is an enlarged side elevation of a detail as viewed in the direction of arrow 2, FIG. 1;

FIG. 3 is a section taken on line 3—3, FIG. 2;

FIG. 4 is a section taken on line 4—4, FIG. 3; and

Figure 5:
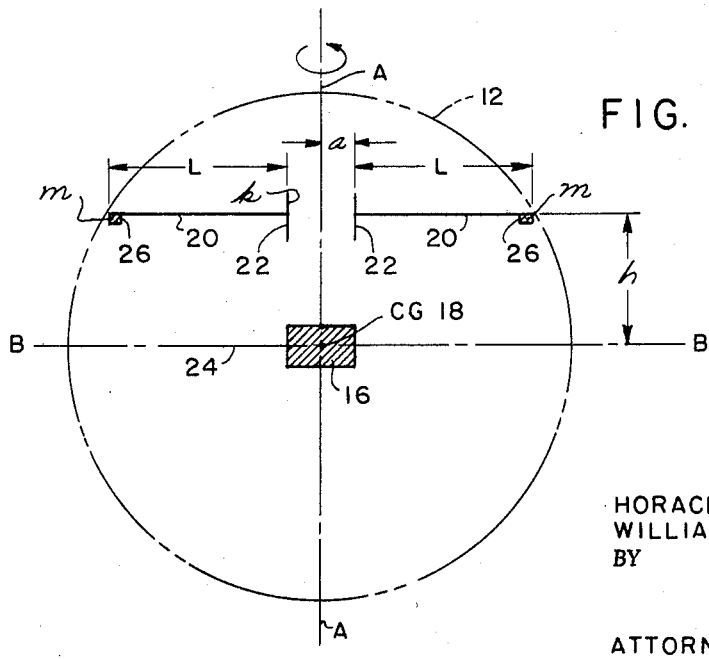

FIG. 5 diagrammatically illustrates the kinematic relationship of parts.

In view of the relatively high costs of placing a satellite into orbit, it is apparent that a device, to meet the objects of the invention, would require as high a probability as possible that it would operate in orbit. Further, the forces in orbit could not be exactly simulated on earth and, even if an adequate damper where devised to operate under simulated conditions such conditions would differ when operating in orbit. In view of the meager knowledge available in this relatively new art, a basic approach to an understanding of the problem of passive control of satellite nutation appeared to be needed.

In approaching this problem, an experimental test vehicle was devised. This comprised a pair of axially spaced discs adjustably secured to a cylinder, which rotated on a universal pivot or bearing within the cylinder. By axial adjustment of the discs the center of the universal bearing could be made to coincide with the center of gravity of the rotating mass or be axially displaced from the center of gravity a desired amount. An upwardly extending spindle was rigidly affixed to the cylinder, its axis passing through the center of gravity, by which the mass could be rotated and nutation effects be observed by observation of the path of the spindle. Various types of movable weights were disposed above the upper disc and observations made of their damping effects after the spinning mass or top was disturbed from its sleeping condition of rotation. In one experiment, a single spherical pendulum was supported for rotation about the spin axis and allowed to swing up and down as well as around the top. While damping was attained under certain ratios of the polar moments of inertia, its action was erratic and certain unbalanced forces remained so that the top did not rotate about its axis of symmetry. It was then found that these unbalanced forces could be reduced by placing the pendulum axis radially outward from the axis of symmetry and counterbalancing the pendulum with a fixed weight. From this next evolved a pair of like pendulums, pivoted about axes displaced radially from the axis of symmetry and 180° apart. In this arrangement of pendulums it was found that under some conditions the two pendulums did not settle to diametrically opposed positions after nutation had been damped. This created an unbalance such that the spindle described a conical path about some axis other than the spin axis. It was determined, however, that nutation was zero from the observation that the spindle rotation frequency was the same as the spin frequency. It was also observed that before nutation disappeared the size of the circle described by the spindle increased and decreased as though the nutation and unbalanced oscillations were beating with each other. A study of this perplexing phenomena led to modifications in the pendulum pivots or hinges. In the first attempts, coulomb or static friction was introduced into the pivots by adjustable springs. It was found, however, that this type of friction, which is not strongly dependent on velocity and having significant starting torque, would not always cause the pendulums to come to rest in their diametrically opposed and balanced position after mutation had been damped out. From these pivots evolved a final type of pivot which embodied two types of friction; first, extremely low static friction while the pendulums are at rest (independent of velocity) and substantial viscous friction (dependent upon velocity) while the pendulums are swinging.

A specific embodiment of this final design will now be described with reference to the drawing in which a satellite 10 is disclosed which may be considered as having a spherical shell 12 containing various instruments 14, the satellite being rotatable about an axis A—A. As will be understood, this rotation will be imparted to the satellite by a booster rocket 15, prior to separation, as previously referred to. For simplicity of disclosure, as shown in FIG. 5, the satellite may be considered as a rotating mass 16 with a C.G. at point 18, the axis of spin passing through the C.G. A pair of pendulums 20, 20, pivoted about axes 22, 22 are disposed at one side of a plane 24 perpendicular to the axis A—A of spin and passing through the C.G. Axes 22, 22 are equi-distant from axis A—A and 180° apart so that a plane includes the pivotal axes and the spin axis. The pendulums carry weights or bobs 26, 26 at their ends and when the pendulums are disposed 180° apart they may be considered as being in balance. During nutation damping the pendulums will swing in opposite directions toward each other in decreasing amplitude until they come to rest in diametrically opposite positions.

As best shown in FIG. 4, the pivot for each pendulum comprises a fixed shaft or pin 28 carried at its ends by any suitable support and on which is mounted a pair of extremely low friction type ball bearings 30, 30. The inner end of each pendulum is provided with a sleeve 32 in which is supported the outer races of the bearings. The bore of this sleeve contains a second sleeve 34, connected to shaft 28 by a universal or cardan joint 36. A slight clearance is provided between the sleeves which is filled with a damping fluid. As will be apparent, the cardan joint permits sleeve 34 to float within sleeve 32. A damping fluid found satisfactory for obtaining the viscous friction between the sleeves is the Dow Corning silicone "200 fluid" having viscosity of about 2400 centipoises. This is introduced into the clearance space between the sleeves so that no air bubbles are present. Since this clearance is small, the surface tension of the fluid at the ends of the annular space will prevent any leakage of fluid and without the use of oil seals which latter would introduce undesired static friction.

A detent 38 is provided adjacent the end of each arm which retains or cages the arms in diametrically opposed relationship until it is desired to release the detents and permit the arms to swing and damp nutation. Such detents may be moved to uncaging position under any desired control, such as radio control. For example, the detents may be spring urged toward uncaging position and latched in caging position by a sear or other suitable device which will release the caging detents for movement to uncaged position.

Figure 1:
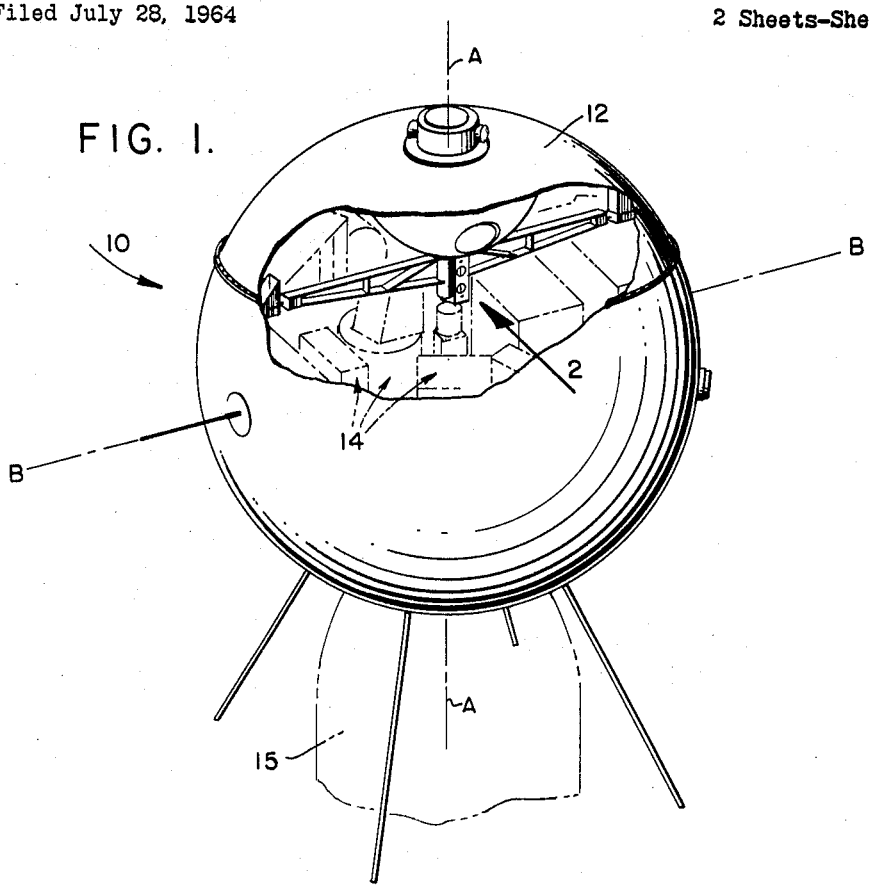
FIG. 1 is a perspective of a satellite employing the subject of the invention, a portion of its shell being broken away and certain internal components being diagrammatically illustrated.

The mathematical solution of the design parameters for optimum nutation damping for all possible constructions of a satellite employing the invention should be recognized as exceedingly complex in view of the many variables involved. An attempt to fully analyze herein such mathematical solution would thus probably serve to confuse rather than to enlighten those skilled in the art in regard to the essentials to be considered in the design of an operable device. A somewhat simplified analysis may be made, however, on the basis of certain assumptions which would normally be incorporated in the design of a practical satellite. First, and with reference to FIG. 1, it will be assumed that the satellite is provided with a casing 10, the outer surface of which is some form of curve of revolution, such as a circle, forming a sphere and that the desired axis of spin extends between opposite poles of the sphere as indicated by axis A—A. The polar moment of inertia about axis A—A will be designated as A. It will also be assumed that the various masses within the sphere are so placed that the transverse moments of inertia about any axis B—B, perpendicular to axis A—A, are equal and which will be indicated as B. Also, axes A—A and B—B intersect at C.G. or the center of gravity of the body. Other parameters illustrated in FIG. 5 are defined as follows:

I—moment of inertia of a pendulum about its hinge axis.
m—pendulum bob mass.
A—polar moment of inertia of the satellite about axis A—A.
B—transverse moment of inertia of the satellite about axis B—B.
h—height of the pendulum above the C.G. of the satellite.
a—distance of the pendulum axis from the symmetry axis.
L—length of the pendulum.
k—pendulum hinge coefficient of viscous friction.
Ω—polar spin of the satellite in radians per sec.

The basic design criteria for the 2-pendulum damper are as follows:

(1) Stability criterion is expressed by the quantity S which must be greater than unity, i.e.

$$S = \frac{(A-B)a}{2h^2L} > 1$$

(2) A measure of nutation damping effectiveness is:

$$\alpha = \frac{\beta(\delta-1)^3 K\delta}{(\rho-\delta^2)^2 + K^2\delta^2}$$

or, at resonance (max) where $\rho = \delta^2$, $$\alpha_R = \frac{\beta(\delta-1)^3}{K\delta}$$

where the dimensionless design parameters $\beta$, $\rho$, $\delta$ and K are derived from the aforementioned real design parameters as follows:

$$\beta = \frac{mh^2}{B} = \frac{m^2h^2L^2}{BI}$$

$$\delta = \frac{A}{B} - 1$$

$$\rho = \frac{a}{L} = \frac{maL}{I}$$

$$K = \frac{k}{mL^2\Omega} = \frac{k}{I\Omega}$$

(3) The resonance condition is: $\rho = \delta^2$ or $$\frac{mLa}{I} = \left(\frac{A-B}{B}\right)^2$$

(4) A good estimate for optimum hinge friction is:

$$K \doteq \left[2\sqrt{\frac{\beta(\delta-1)^3}{\delta}}\right] 1.2$$

However final adjustment by experiment should be made.

(5) Placement tolerance: Ideally, the missile axis of maximum moment of inertia intersects the mid-point of the line between the pendulum damper hinge axis. (a) Small displacement of the axis along this line changes nothing but the resonance situation. (b) Small displacement of the axis away from the line changes the equilibrium position of the pendulum, thereby creating or increasing, unbalance.

Obviously many modifications and variations of the present invention are possible in the light of the above teachings. It is therefore to be understood that within the scope of the appended claims the invention may be practiced otherwise than as specifically described.

What is claimed is:

1. Apparatus for damping nutation in a spin stabilized satellite adapted to rotate about a desired axis of symmetry, said satellite having a mass distribution such that it spins about its axis of maximum moment of inertia and being substantially in dynamic balance, said apparatus, comprising;
  (a) a pair of like pendulums journaled by arms to the satellite at their inner ends for rotation about axes disposed 180° apart, said axes being spaced radially outward from and parallel to the spin axis, whereby the centers of mass of the pendulum may swing in the same plane,
  (b) said plane being perpendicular to the spin axis and disposed laterally from a parallel plane containing the center of gravity of the satellite,
  (c) said arms being so journaled to provide a minimum of static friction, to thereby permit same to readily start to swing away from predetermined and diametrically opposed positions of rest and without frictional resistance,
  (d) said arms also being so journaled to provide appreciable viscous friction when swinging, to thereby damp their swinging movements,
  (e) the construction and arrangement being such that when said satellite nutates about said axis of spin, said arms oscillate about their predetermined positions of rest and oscillate with decreasing amplitudes to their predetermined positions of rest when said nutation is damped and said satellite again comes to a position rotating about said axis of symmetry.

2. Apparatus in accordance with claim 1 including means for caging said arms at their predetermined positions of rest, whereby said arms are prevented from oscillating while said satellite is being boosted to its orbit by a thrust motor, and means for uncaging said arms for oscillation after the boost motor is separated from the satellite.

3. Apparatus in accordance with claim 2 wherein each arm is provided with a first sleeve at its inner end, said first sleeve being rotatable about a second sleeve affixed to the satellite, and a fluid disposed between the sleeves to provide said viscous friction.

4. Apparatus in accordance with claim 3 wherein said second sleeve is floatingly supported within the first sleeve.

5. Apparatus in accordance with claim 4 wherein said first and second sleeves are interconnected by a cardan joint.

No references cited.

FERGUS S. MIDDLETON, *Primary Examiner.*